Figure 1:
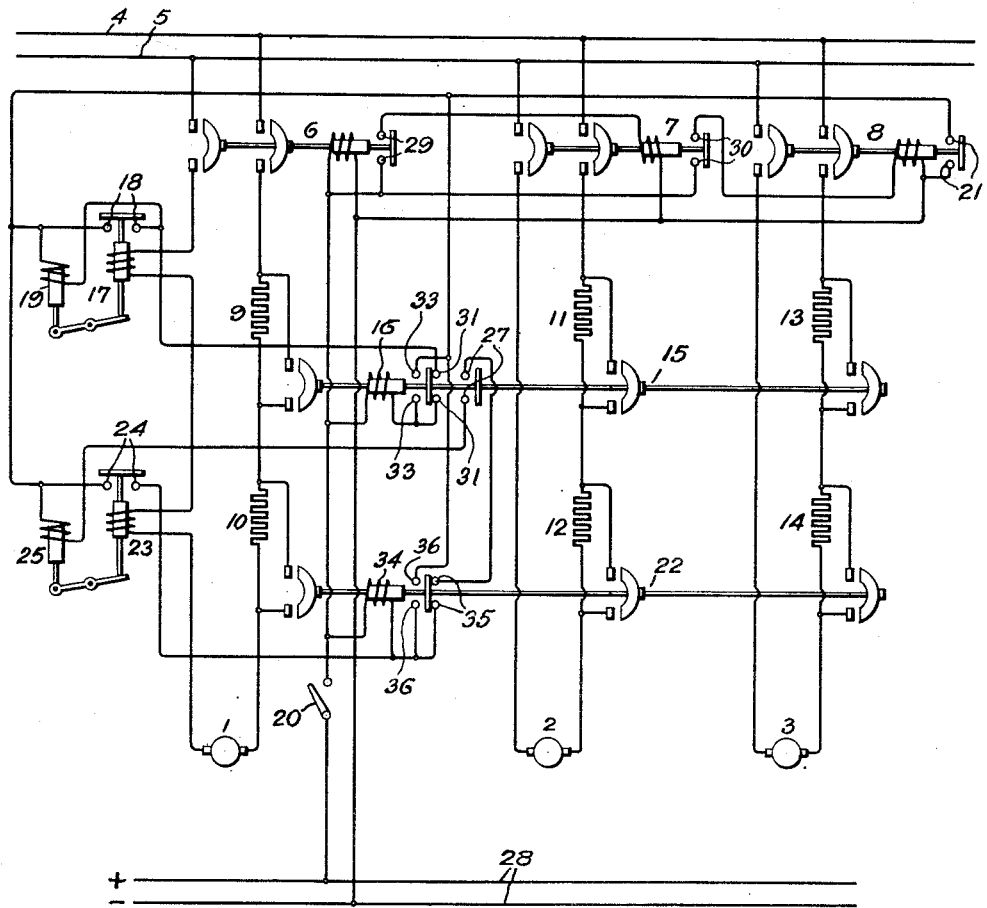

Oct. 21, 1924.

F. P. WHITAKER 1,512,255

SYSTEM OF ELECTRIC DISTRIBUTION

Filed Nov. 19, 1923

Inventor:
Frank P. Whitaker;
by
His Attorney.

Patented Oct. 21, 1924.

1,512,255

UNITED STATES PATENT OFFICE.

FRANK PERCY WHITAKER, OF RUGBY, ENGLAND, ASSIGNOR TO GENERAL ELECTRIC COMPANY, A CORPORATION OF NEW YORK.

SYSTEM OF ELECTRIC DISTRIBUTION.

Application filed November 19, 1923. Serial No. 675,692.

*To all whom it may concern:*

Be it known that I, FRANK PERCY WHITAKER, a subject of the King of Great Britain, residing at Rugby, county of Warwick, England, have invented certain new and useful Improvements in Systems of Electric Distribution, of which the following is a specification.

My invention relates to electric distribution systems and more particularly to direct current networks which are completely interconnected, that is, systems in which the feeders that run out from the main stations or substations do not feed independent areas but supply current to a common network. In such systems it is very difficult to restore the voltage of the network to its normal value after a complete shut down occurs, especially where the direct current network is supplied from rotary converters.

One method which has been used in practice to restore the voltage after a complete shut down, has been to use a number of motor generator sets as sources of current for the network. When it is desired to restore the voltage, the motor generator sets are all connected to the network and the fields of the direct current generators of the motor generator sets are gradually increased until the voltage of the network is restored to its normal value.

When the network, however, is supplied from rotary converters it is impossible to vary the direct current voltages of the converters over a very great range, and it is not advisable simultaneously to connect all the rotaries directly to the network so as to pick up the whole load at the same time.
Therefore, it is apparent that if the converters are not connected simultaneously, the first machine to be connected becomes overloaded and is automatically disconnected from the network before it is possible to distribute the load equally between all of the converters.

One object of my invention is to provide an improved arrangement whereby the supply of current to a direct current network fed by rotary converters or other converting or generating apparatus may easily be restarted after a complete shut down. In accordance with my invention resistors or other suitable current limiting means are provided so that after the occurence of a complete shut down the resistors may be inserted between the sources and the network and may be short-circuited either wholly or in sections on restarting, the voltage of the network increasing as the resistors are short-circuited. Automatic switches may be provided for this purpose and may be so controlled that similar sections of the resistor associated with the various sources are simultaneously short-circuited. While my improved arrangement is especially adapted for use in a system where the network is supplied from rotary converters, it is evident that it is not limited thereto but may be employed where the network is supplied from generators or any other suitable sources of current.

In cases where the network is a three wire system, it is either necessary to provide resistors in both sides of the system or if the out of balance current is only a small proportion of the output from each source, the sources may be connected to the network as two wire machines, the third wire connection between the sources and the network being made as soon as possible after the last section of the resistor is short circuited. This result may be effected either automatically or by hand.

My invention will be better understood from the following description taken in connection with the accompanying drawing and its scope will be pointed out in the appended claims.

Figure 2:
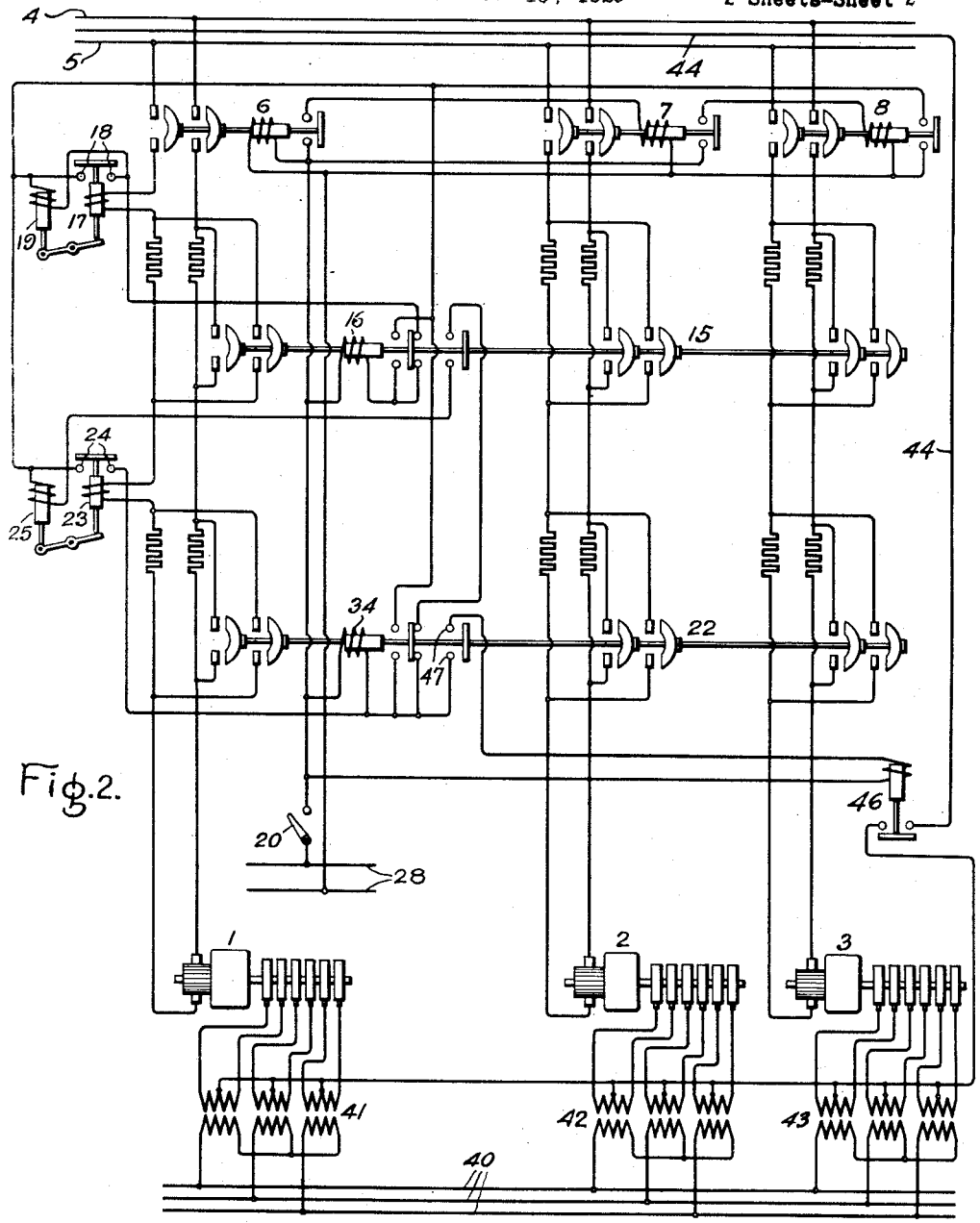

In the accompanying drawing, Fig. 1 shows one embodiment of my invention for connecting a plurality of sources of current to a two wire network, and Fig. 2 shows an embodiment of my invention for connecting a plurality of sources of current to a three wire network.

Referring to Fig. 1, the sources of current 1, 2 and 3, which are shown as direct current generators, are arranged to be connected to the conductors 4 and 5 of a direct current network by the double pole contactors 6, 7 and 8 respectively. Suitable current limiting means are arranged to be connected in series with each source so as to limit the current supplied thereby when the sources are first connected to the network. As shown in the drawing, the resistors 9 and 10 are arranged to be connected in series with the source 1, the resistors 11 and 12 are arranged to be connected in series with the source 2 and the resistors 13 and 14 are arranged to be connected in series with the source 3.

In order to increase the voltage across the network, after all of the sources are connected thereto, the resistors 9, 11 and 13 are arranged to be short-circuited simultaneously in any suitable manner. For accomplishing this result I have shown a three pole contactor 15 which is arranged to be closed automatically when the current supplied to the network through the resistors is less than a predetermined amount. The contactor 15 is provided with a closing coil 16 the circuit of which is controlled by a current responsive device 17 which is controlled by the current supplied to the network by the source 1. The relay 17 is arranged to complete the circuit of the coil 16 when the current through the resistor 9 is less than a predetermined value.

In order to prevent the contacts 18 of the relay 17 from being closed when the sources are entirely disconnected from the network, a relay 19 is provided which is mechanically connected to the relay 17 so that when both relays are not energized the weight of the movable element of the relay 19 is sufficient to cause the movable element of the relay 17 to be moved to the position it occupies when the current through the coil of the relay 17 is great enough to maintain the contacts 18 open.

As shown the contactors 6, 7 and 8 are interlocked so that they close in this sequence when a hand switch 20 is closed and the circuit of the coil of the relay 19 is controlled by the contacts 21 on the contactor 8 so that contacts 18 remain open until the circuit breaker 8 closes. Since the contactor 6 closes before contactor 8 closes, the coil 17 becomes energized and maintains the contacts 18 open after the relay 19 becomes energized, if the current supplied to the network exceeds a predetermined value.

It is evident that the current supplied by one source bears a predetermined relation to the total current supplied by all the sources after contactor 8 closes, since they are all connected in parallel and therefore the current through the coil of the relay 17 is an indication of the total current being supplied by all the sources.

The resistors 10, 12 and 14 are arranged to be short-circuited simultaneously by a three pole contactor 22 after the contactor 15 closes. The circuit of the closing coil 34 of the contactor 22 is controlled by a current relay 23 connected in series with the source 1. The relay 23 closes its contacts 24 and completes the coil of the contactor 22 when the current supplied by the source 1 is less than a predetermined value. In order that the contacts 24 may be open when the sources are entirely disconnected from the network so as to prevent the contactor 22 from being closed, a relay 25 is provided which is mechanically connected to the relay 23 so that the contacts of the relay 23 are maintained in their open position when both of the relays are not energized. The circuit of the relay 25 is controlled by the contacts 27 on the contactor 15 so that the contactor 22 cannot be closed until after the contactor 15 has closed.

The operation of the system shown in Fig. 1 is as follows: When it is desired to reconnect the sources 1, 2 and 3 to the mains 4 and 5 after they have been disconnected therefrom, the switch 20 is closed. This connects the closing coil of the contactor 6 across a suitable source of current 28 so that the contactor 6 closes and connects the generator 1 to the network with the resistors 9 and 10 and the coils of the current relays 17 and 23 in series therewith. The closing of the auxiliary contacts 29 on the circuit breaker 6, when it closes, connects the closing coil of the contactor 7 across the source of current 28 through the switch 20 so that the contactor 7 closes and connects the generator 2 to the network with the resistors 11 and 12 in series therewith. The closing of the auxiliary contacts 30 on the circuit breaker 7, when it closes, connects the closing coil of the contactor 8 across the source of current 28 through the switch 20 so that the contactor 8 closes and connects the generator 3 to the network with the resistors 13 and 14 in series therewith. These resistors are preferably designed so as to limit the current supplied by each machine to a safe operating value.

When the contactor 8 closes its auxiliary contacts 21, a circuit is completed from the positive side of the source 28 through switch 20, coil 16 of the contactor 15, auxiliary contacts 31 of the contactor 15, coil of the relay 19, contacts 21 of the contactor 8 to the negative side of the source 28. Sufficient current flows through this circuit to actuate the relay 19 so that the contacts 18 of the relay 17 may close when the current through the coil of the relay 17 is less than a predetermined value. It will be observed that the coil of the relay 17 is energized as soon as the contactor 6 closes so as to maintain the contacts 18 open, after the relay 19 is energized, if the current supplied to the network exceeds a predetermined value.

When the contacts 18 of the relay 17 close, they short circuit the coil of the relay 19 in the circuit of the closing coil 16 heretofore traced so that sufficient current flows through the closing coil 16 to close the contactor 15 and thereby simultaneously short circuit resistors 9, 11 and 13 thereby increasing the voltage across the network a predetermined amount. The closing of the auxiliary contacts 33 of the contactor 15 completes a circuit in shunt with the contacts 18 and the coil of the relay 17 so that a holding circuit for the closing coil 16 is completed which will maintain the contactor 15 closed independently of the relay 17.

The closing of the auxiliary contacts 27 of the contactor 15 completes a circuit from the positive side of the source 28, switch 20, closing coil 34 of the contactor 22, auxiliary contacts 35 of the contactor 22, auxiliary contacts of the contactor 15, coil of the relay 25, auxiliary contacts 21 of the contactor 8, to the negative side of the source 28. The current in this circuit is not sufficient to close the contactor 22 but is sufficient to cause the relay 25 to operate so that the current relay 23 can close its contacts 24 when the current through its coil is less than a predetermined value. When the contacts 24 close, they complete a short circuit around the coil of the relay 25 in the above traced circuit of the closing coil 34 so that the contactor 22 closes and simultaneously short circuits the resistors 10, 12 and 14. The generators 1, 2 and 3 are now connected directly to the network so that the voltage across the network is restored to its normal value. The closing of the auxiliary contacts 36 of the contactor 22, when it closes, completes a holding circuit for the coil 34 in shunt around the contacts 24 and the coil of relay 25.

By simultaneously decreasing the amount of resistance in series with all of the sources, the increase in current supplied to the network is equally distributed between all the sources so that none of them is greatly overloaded. While the resistance in series with each generator is shown as being arranged to be short circuited in two steps, it is evident that any number of steps may be used so long as the increase in current produced by short-circuiting the resistors is not excessive. Furthermore, it is evident that instead of arranging the short circuiting contactors 15 and 22 so that they are automatically controlled, they may be manually controlled.

In the embodiment shown in Fig. 2 the sources 1, 2 and 3 are shown as rotary converters which are arranged to be connected to an alternating current supply circuit 40 by means of the three banks of transformers 41, 42 and 43 respectively. The direct current network, as shown, comprises the two main conductors 4 and 5 and a neutral conductor 44 which is arranged to be connected to the neutral point of the secondary windings of all of the banks of transformers. When restarting, this neutral connection is effected as soon as possible after all of the resistors have been short-circuited. This may be effected manually or automatically. As shown a relay 46, which is arranged to be connected across the source 28 by the auxiliary contacts 47 of the contactor 22, when it closes, is arranged to complete automatically this neutral connection. Therefore this connection is effected after all of the resistors have been short-circuited and the converters are directly connected to the network.

Also in the embodiment shown in Fig. 2, the current limiting means are included in both of the connections between each source and the main conductors 4 and 5 of the network. Therefore each of the contactors 15 and 22 are designed to short circuit six sections of resistors instead of three as in Fig. 1.

The operation of the embodiment shown in Fig. 2 is believed to be obvious from the description of the operation of the embodiment shown in Fig. 1 and therefore a detailed description thereof is believed to be unnecessary.

While I have shown and described several embodiments of my invention I do not desire to be limited thereto, but seek to cover in the appended claims all those modifications that fall within the true spirit and scope of my invention.

What I claim as new and desire to secure by Letters Patent of the United States is:—

1. In a system of electric distribution comprising a plurality of sources of current arranged to be connected to a common network, an arrangement for connecting said sources to the network to restore the voltage thereof to normal after all of the sources have been disconnected therefrom comprising means for connecting said sources to the network with current limiting means in series with each source, and means for simultaneously varying the current limiting means in series with all of said sources.

2. In a system of electric distribution comprising a plurality of sources of current arranged to be connected to a common network, an arrangement for connecting said sources to the network to restore the voltage thereof to normal after all of the sources have been disconnected therefrom comprising a plurality of resistors, means for connecting each source to the network with one of said resistors in series therewith, and means for simultaneously short-circuiting the resistors in series with said sources.

3. In a system of electric distribution comprising a plurality of rotary converters arranged to be connected to a common direct current network, an arrangement for connecting said converters to the network to restore the voltage thereof to normal after all of the converters have been disconnected therefrom comprising a plurality of resistors, means for connecting each converter to the network with one of said resistors in series therewith, and means controlled by the current supplied to said network by one of said converters for simultaneously short-circuiting the resistors in series with all of said converters.

4. In a system of electric distribution comprising a plurality of sources of current arranged to be connected to a common network, an arrangement for connecting said sources to the network to restore the voltage thereof to normal after all of the sources have been disconnected therefrom comprising means for connecting each source to the network with current limiting means in series therewith, and means adapted to be operated when all of said last mentioned means have been operated and the current supplied to said network by one of said sources is less than a predetermined value for simultaneously short circuiting the resistors in series with all of said sources.

5. In a system of electric distribution comprising a direct current network having two main conductors and a neutral conductor and a plurality of sources of direct current, each having two main terminals and a neutral terminal arranged to be connected to said network, an arrangement for connecting said sources to the network to restore the voltage thereof to normal after all of the sources have been disconnected therefrom comprising means for connecting said main terminals of said sources to the main conductors of said network with current limiting means in series therewith, means for simultaneously varying the current limiting means in series with all of said sources, and means for simultaneously connecting the neutral conductor of said network to the neutral terminals of all of said sources.

6. In a system of electric distribution comprising a three-wire direct current network, a source of polyphase circuit, a plurality of rotary converters arranged to be connected between said polyphase circuit and said network, and transformers interposed between each rotary converter and said polyphase circuit, the neutral points of all of said transformers being connected together, an arrangement for connecting the said rotary converters to the network to restore the voltage thereof to normal after all of said rotary converters have been disconnected therefrom comprising means for connecting the direct current brushes of said rotary converters to the main conductors of the three wire network with current limiting means in series therewith, means controlled in accordance with the current supplied to the network by said rotary converters for simultaneously varying the current limiting means in series with all of said sources, and means operative when the current limiting means in series with all of the rotary converters have been short circuited for connecting the neutral conductor of said network to the neutral points of all of said transformers.

7. The method of restoring the voltage of a network to normal after all of the sources have been disconnected therefrom which consists in connecting a plurality of sources to the network with current limiting means in series with each source, and then simultaneously varying the current limiting means in series with the sources.

8. The method of restoring to normal the voltage of a network which is normally supplied by rotary converters after all of the converters have been disconnected therefrom which consists in connecting each one of a plurality of said converters to the network with current limiting means in series therewith, and then simultaneously short circuiting portions of the current limiting means in series with the converters until all of the current limiting means are short circuited.

9. The method of restoring the voltage of a three wire direct current network to normal after all of the sources have been disconnected therefrom which consists in connecting the main conductors of a plurality of sources to the main conductors of the network with current limiting means in series with each source, then simultaneously short circuiting the current limiting means in series with the sources, and then connecting the neutral conductor of the sources to the neutral conductor of the network.

In witness whereof, I have hereunto set my hand this first day of November, 1923.

FRANK PERCY WHITAKER.

Witnesses:
   N. Edghian-Dallin,
   J. A. Foster.